(12) United States Patent
Boyer et al.

(10) Patent No.: US 8,116,796 B2
(45) Date of Patent: Feb. 14, 2012

(54) MULTI-TRANSCEIVER PORTABLE RADIO COMMUNICATIONS DEVICE AND RELATED METHOD

(75) Inventors: Adrian Boyer, Pittsford, NY (US); Thomas Doherty, Webster, NY (US); David Chauncey, Fairport, NY (US); Michael Buddendeck, Webster, NY (US)

(73) Assignee: Harris Corporation, Melbourne, FL (US)

( * ) Notice: Subject to any disclaimer, the term of this patent is extended or adjusted under 35 U.S.C. 154(b) by 942 days.

(21) Appl. No.: 11/971,570

(22) Filed: Jan. 9, 2008

(65) Prior Publication Data

US 2009/0176523 A1 Jul. 9, 2009

(51) Int. Cl.
*H04B 7/00* (2006.01)

(52) U.S. Cl. ............ 455/517; 455/136; 455/554.2; 455/560; 455/561; 455/63.1; 455/464; 455/509; 370/276; 370/329

(58) Field of Classification Search .......... 455/517, 455/136, 553.1, 554.2, 560, 561, 63.1, 450, 455/454, 464, 509, 511, 515, 516; 370/276, 370/296, 310, 329
See application file for complete search history.

(56) References Cited

U.S. PATENT DOCUMENTS

| 6,111,860 | A  | * | 8/2000  | Braun       | 370/276 |
| 2004/0092281 | A1 |   | 5/2004  | Burchfiel   | 455/522 |
| 2006/0270346 | A1 | * | 11/2006 | Ibrahim et al. | 455/41.2 |
| 2007/0232358 | A1 | * | 10/2007 | Sherman     | 455/560 |
| 2008/0233864 | A1 | * | 9/2008  | Rofougaran et al. | 455/11.1 |
| 2009/0147756 | A1 | * | 6/2009  | Yang et al. | 370/336 |

FOREIGN PATENT DOCUMENTS

| EP | 1583295 | 10/2005 |
| EP | 1727291 | 11/2006 |

OTHER PUBLICATIONS

"SecNet 54™ and SecNet 11® Plus Brochure" Assured Communications®, Harris Corporation, 2007, 9 pages, available at http://www.rfcomm.harris.com/products/embeddable-security/SecNet54_11_Brochure.pdf.
"RF-5800V-HH Falcon® II Advanced VHF Tactical Handheld Radio Brochure" Assured Communications™, Harris Corporation, 2006, 2 pages, available at www.harris.com.

* cited by examiner

*Primary Examiner* — Shaima Q Aminzay
(74) *Attorney, Agent, or Firm* — Allen, Dyer, Doppelt, Milbrath & Gilchrist, P.A.

(57) ABSTRACT

A portable radio communications device is for transmitting data and voice communications. The portable radio communications device may include a portable housing, a radio transceiver operating at a frequency in a range of 30 MHz-3000 MHz and being carried by the portable housing for direct communication with a corresponding radio transceiver, and a metropolitan area network (MAN) transceiver carried by the portable housing for indirect communication with a corresponding MAN transceiver via a MAN base station. The portable radio communications device may also include a controller carried by the portable housing for selectively allocating transmission of the data and voice communications between the radio transceiver and the MAN transceiver based upon a received signal characteristic. The controller may preferentially allocate the voice communications and the data communications to the radio transceiver and the MAN transceiver, respectively.

20 Claims, 3 Drawing Sheets

MULTI-TRANSCEIVER PORTABLE RADIO COMMUNICATIONS DEVICE AND RELATED METHOD

FIELD OF THE INVENTION

The present invention relates to the field of communications, and, more particularly, to a portable radio communications device and a related method.

BACKGROUND OF THE INVENTION

Effective communication may be important to any large organization that rapidly deploys and moves personnel to different areas, for example, law enforcement, and fire departments. These organizations typically comprise a large number of mobile personnel that usually maintain a horizontal flow, i.e. with other mobile personnel, of communication and a vertical flow, i.e. with a command center, of communication. Initially, mobile personnel are typically issued a personal handheld transceiver, for example, a walkie-talkie, to provide access to both horizontal and vertical flows of communication.

The typical handheld transceiver may operate in the very high frequency (VHF) range of 30 MHz to 300 MHz or the ultra high frequency (UHF) range of 300 MHz and 3,000 MHz, and may provide only voice communications. Nonetheless, the typical handheld transceiver has a long range and does not require a network infrastructure, for example, base stations and repeaters, to operate. For example, the Harris Corporation of Melbourne, Fla., and the present assignee of the present invention, offers a line of such radios under the designations of RF-5800V, RF-5800M, and AN/PRC-152.

As demands on these organizations have grown, the vertical flow of communication has diversified to include data communications. Moreover, the hierarchy of these organizations has grown and further extended the vertical flow of communication. To better serve the vertical flow of communication, these organizations typically deploy a second system of communication, for example, cellular based network or Internet Protocol (IP) based high capacity line of sight (HCLOS) systems. These vertical flow communications systems typically require a significant network infrastructure and may not extend completely down the vertical chain of command, for example, the local police station may have direct access to the vertical flow of communication but the individual police officer may not have similar access. In other words, the mobile user is typically issued a personal handheld transceiver capable of voice communications and limited data communications capability.

One approach to the above drawback is to issue each mobile user a plurality of portable devices for directly accessing the vertical flow of communication, for example, an IEEE 802.11 device, and the horizontal flow of communication. For example, the Harris Corporation of Melbourne, Fla. offers a line of such radios under the designation of SecNet 11® Product Concept. Unfortunately, the mobile person then carries two communications devices, and this approach is more costly in terms of equipment and maintenance. Further, the mobile person may have to carry more physical weight in equipment. Moreover, if the mobile person wishes to send data communications to a local destination, the mobile person may need to access the vertical flow of communication. In other words, the mobile user may regularly have to determine which portable communications device is favorable, incurring a cost of time and a cost to communication efficiency. Moreover, if one of the communications devices is not within range of its network, more specifically, the IEEE 802.11 device, the mobile user may still have minimal communications capabilities. Multi-transmission for interference is described in U.S. Patent Application Publication No. 2004/0092281 to Burchfiel. However, this approach does not address allocation of data and voice transmission based upon the content of the transmission.

SUMMARY OF THE INVENTION

In view of the foregoing background, it is therefore an object of the present invention to provide a communications system for providing robust high availability voice and data communications.

This and other objects, features, and advantages in accordance with the present invention are provided by a communications system for transmitting voice and data communications. The communications system may comprise a plurality of portable radio communications devices, and at least one metropolitan area network (MAN) base station. Each portable radio communications device may include a portable housing, a radio transceiver operating at a frequency in a range of 30 MHz-3000 MHz and being carried by the portable housing for direct communication with a corresponding radio transceiver, a MAN transceiver carried by the portable housing for indirect communication with a corresponding MAN transceiver via the MAN base station, and a controller carried by the portable housing for selectively allocating transmission of data and voice communications between the radio transceiver and the MAN transceiver based upon at least one received signal characteristic. The controller may preferentially allocate the voice communications and the data communications to the radio transceiver and the MAN transceiver, respectively. Advantageously, the portable radio communications device of the communications system may provide robust high availability data and voice communications capabilities to a mobile user in a single device. Moreover, the data and voice communications are transmitted using the likely most efficient and/or effective transceiver.

Furthermore, the radio transceiver may comprise a half-duplex, VHF analog transceiver. The MAN transceiver may comprise an orthogonal frequency-division multiple access (OFDMA) transceiver.

In certain embodiments, the controller may also allocate transmission of the data and voice communications based upon an intended recipient of the transmitted data and voice communications. Moreover, the MAN transceiver may transmit the voice communications based upon voice over Internet Protocol (VoIP). For example, the MAN transceiver may comprise an IEEE 802.16 WIMAX transceiver.

Another aspect is directed to a method of operating a portable radio communications device comprising a portable housing, a radio transceiver operating at a frequency in a range of 30 MHz-3000 MHz carried by the portable housing, and a MAN transceiver carried by the portable housing. The method may include monitoring at least one received signal characteristic, and selectively allocating transmission of data and voice communications between the radio transceiver and the MAN transceiver based upon the received signal characteristic using a controller carried by the portable housing. The method may also include preferentially allocating the voice communications and the data communications to the radio transceiver and the MAN transceiver, respectively, using the controller.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
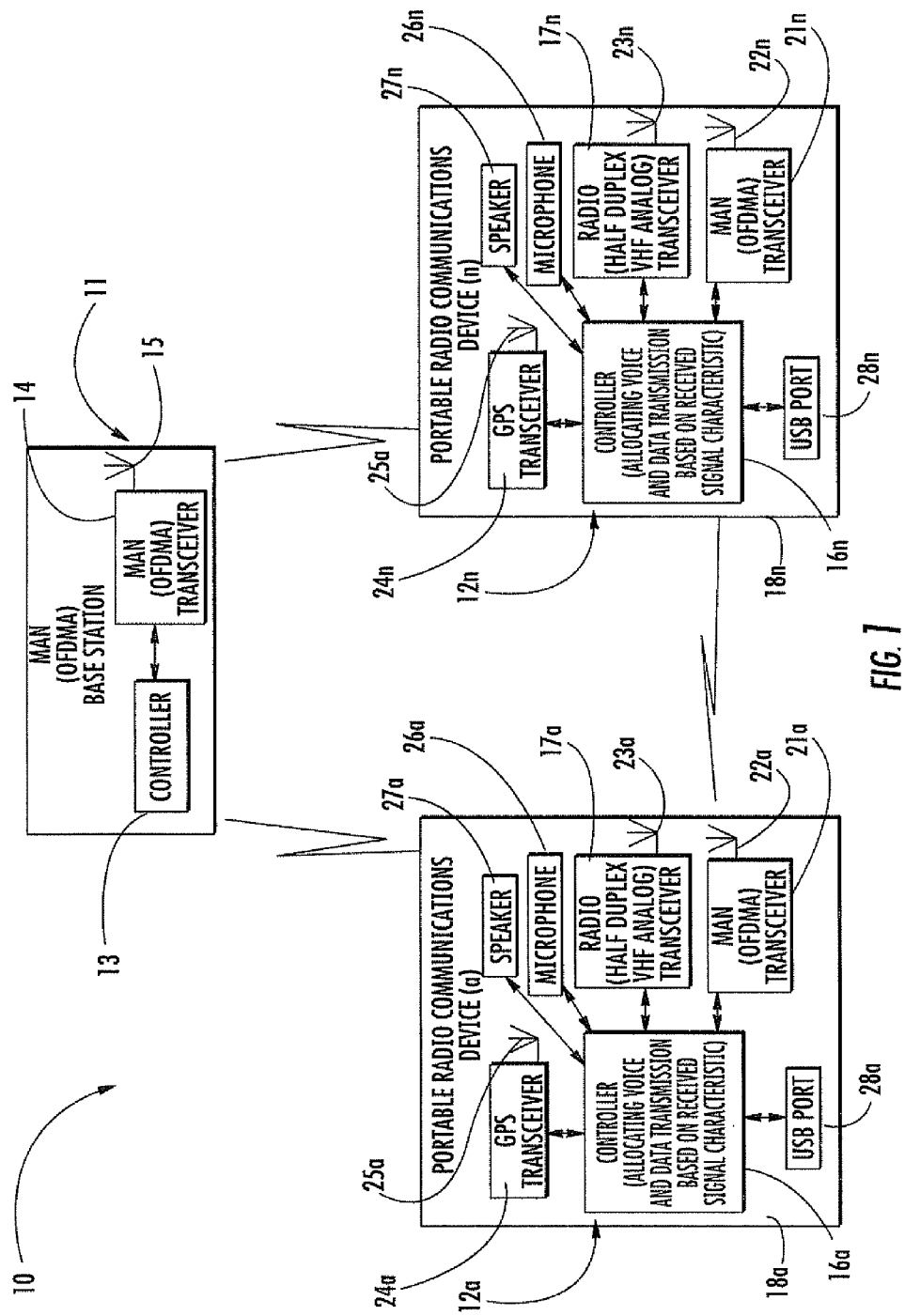
FIG. 1 is schematic diagram of the communications system, according to the present invention.

Referring initially to FIG. 1, a communications system 10 according to the present invention is described. The communications system 10 illustratively includes a plurality of portable radio communications devices 12a-12n, and an MAN base station 11, such as, an OFDMA base station. The MAN base station 11 illustratively includes a controller 13, an MAN transceiver 14 coupled to the controller, and an antenna 15 coupled to the MAN transceiver. The illustrated MAN base station 11 may comprise, for example, a base station for a wideband infrastructure based communications protocol, an IEEE 802.16 (WiMAX) base station, or any Open Base Station Architecture Initiative (OBSAI) compatible WiMAX base station.

Although illustrated with a single MAN base station 11, as will be appreciated by those skilled in the art, the communication system 10 may include a plurality of MAN base stations to expand the infrastructure and coverage of the MAN. The MAN may provide the infrastructure for the vertical flow of communications, i.e. communications from the user of the portable radio communications device 12a-12n to the local command center, to the central command center, and so forth.

Each portable radio communications device 12-12n illustratively includes a portable housing 18a-18n, and a controller 16a-16n carried by the portable housing. The portable radio communications device 12a-12n may provide data and voice communications services. Each portable radio communications device 12a-12n also illustratively includes a Universal Serial Bus (USB) port 28a-28n, which is coupled to the controller 16a-16n, for providing a commonly used interface for the user's data communications. As will be appreciated by those skilled in the art, the portable radio communications device 12a-12n illustratively includes a speaker 27a-27n coupled to the controller 16a-16n, and a microphone 26a-26n also coupled to the controller for providing a interface for voice communications. Alternatively, the user may couple a headset to the portable radio communications device 12a-12n.

Each portable radio communications device 12-12n illustratively includes a radio transceiver 17a operating at a frequency in a range of 30 MHz-3000 MHz carried by the portable housing 18a for direct communication with a corresponding radio transceiver 17n. The radio transceiver 17a-17n may comprise a half-duplex, VHF analog transceiver. In other words, while using the radio transceiver 17a, the portable radio communications device 12a may transmit data and voice communications directly to the corresponding portable radio communications device 12n.

As will be appreciated by those skilled in the art, the radio transceiver 17a-17n has a typical transmission range of 3-20 km, depending on the prevailing terrain. In other words, the radio transceiver 17a-17n may comprise an infrastructureless (i.e. not using an intervening repeater or base station) radio frequency transceiver capable of a relatively long distance range.

Each portable radio communications device 12a-12n also illustratively includes an MAN transceiver 21a, such as, an IEEE 802.16 WiMAX or scalable OFDMA transceiver, carried by the portable housing 18a for indirect or direct data and voice communication with a corresponding MAN transceiver 21n via the MAN base station 11. The MAN transceiver 21a-21n, being dependent on the MAN infrastructure, may have a lesser transmission range than the radio transceiver 17a-17n, for example, 3-5 km to the nearest base station, but longer end-to-end range, dependent on the available infrastructure, as will be appreciated by those skilled in the art. Moreover, the MAN transceiver 21a-21n may transmit the voice communications based upon voice over Internet Protocol (VoIP).

In other words, while using the MAN transceiver 21a, the portable radio communications device 12a first transmits the voice and data communications to the MAN base station 11, which then retransmits the voice and data communications to the recipient portable radio communications device 12n. As will be appreciated by those skilled in the art, if the communications system 10 comprises a plurality of MAN base stations, the voice and data communications may be routed to the appropriate MAN base station and then retransmitted.

Each portable radio communications device 12-12n illustratively includes a Global Positioning System (GPS) transceiver 24a-24n, and an antenna 25a-25n coupled thereto. As will be appreciated by those skilled in the art, each voice and data communication may include a GPS stamp including the user's current position at the time of transmission. Each portable radio communications device 12a-12n illustratively includes respective antennas 22a-22n, 23a-23n coupled to and for the MAN transceivers 21a-21n and the radio transceivers 17a-17n, respectively.

The controller 16a-16n is for selectively allocating transmission of the data and voice communications between the radio transceiver 17a-17n and the MAN transceiver 21a-21n based upon at least one received signal characteristic. For example, the received signal characteristic may comprise at least one of a signal-to-noise ratio, absolute received signal amplitude, and an error rate. Once the allocation of the data and voice communications of the portable radio communications device 12a-12n is made, the data and voice communications are transmitted base upon their allocation using the radio transceiver 17a-17n for direct communication, and the MAN transceiver 21a-21n for indirect communication.

Advantageously, the portable radio communications device 12a-12n provides robust data and voice communications capabilities to the user in a single device. In other words, depending on the received signal quality for the radio transceiver 17a-17n and the MAN transceiver 21a-21n, the controller 16a-16n allocates the data and voice communications generated by the user of the respective portable radio communications device 12a-12n to the transceiver with the present desired capability to transmit. The controller 16a-16n continuously or periodically monitors the received signal characteristics and adjusts in real time the corresponding data and voice communications allocation.

The controller 16a-16n may also allocate transmission of the data and voice communications based upon an intended recipient of the transmitted data and voice communications. For example, if the user of the portable radio communications device 12a-12n needs to transmit a voice communication to a recipient most likely to be outside the range of the radio transceiver 17a-17n, the controller 16a-16n will use the MAN transceiver 21a-21n and the requisite MAN base station 11 infrastructure, i.e. the MAN.

Advantageously, the user of the portable radio communications device 12a-12n does not need to manually determine which transceiver is most effective for each communication. Moreover, the controller 16a-16n may seamlessly handoff data and voice communications between the radio transceiver 17a-17n and the MAN transceiver 21a-21n. In other words, while using one transceiver to transmit, if the signal characteristics deteriorate for that transceiver, the controller 16a-16n may concurrently begin transmission with the other transceiver and move the transmission workload to the better suited transceiver.

Moreover, if the user of the portable radio communications device 12a-12n is in a service area where the MAN has little or poor network coverage, the controller 16a-16n will allocate all voice and data communications through the radio transceiver 17a-17n, which has better range and does not require network infrastructure. Advantageously, the mobile radio communications device 12a-12n provides voice and data communication capabilities in areas without MAN presence.

As will be appreciated by those skilled in the art, the MAN transceiver 21a-21n may be the desired transceiver for data communications because of the greater available bandwidth and error correction. Conversely, the radio transceiver 17a-17n may be the desired transceiver for voice communications because of the large transmission range and lack of a network infrastructure. Additionally, the controller 16a-16n may preferentially allocate the voice communications to the radio transceiver 17a-17n. The controller 16a-16n may also preferentially allocate the data communications to the MAN transceiver 21a-21n. Moreover, the controller 16a-16n may also allocate the data and voice communications further based upon the Quality of Service (Qos) needed for the voice and data communications. Advantageously, the data and voice communications are transmitted using the most efficient transceiver.

Advantageously, the controller 16a-16n may encrypt the data and voice communications using an encryption algorithm, for example, Internet Protocol Security (IPSEC), the Data Encryption Standard (DES), and the Advanced Encryption Standard (AES). More specifically, the controller 16a-16n may comprise a Citadel® cryptographic sub-processor for implementing the Citadel® encryption algorithm, available from the Harris Corporation of Melbourne, Fla. Once encrypted, the data and voice communications may be transmitted on the MAN transceiver 21a-21n and the radio transceiver 17a-17n.

Figure 2:
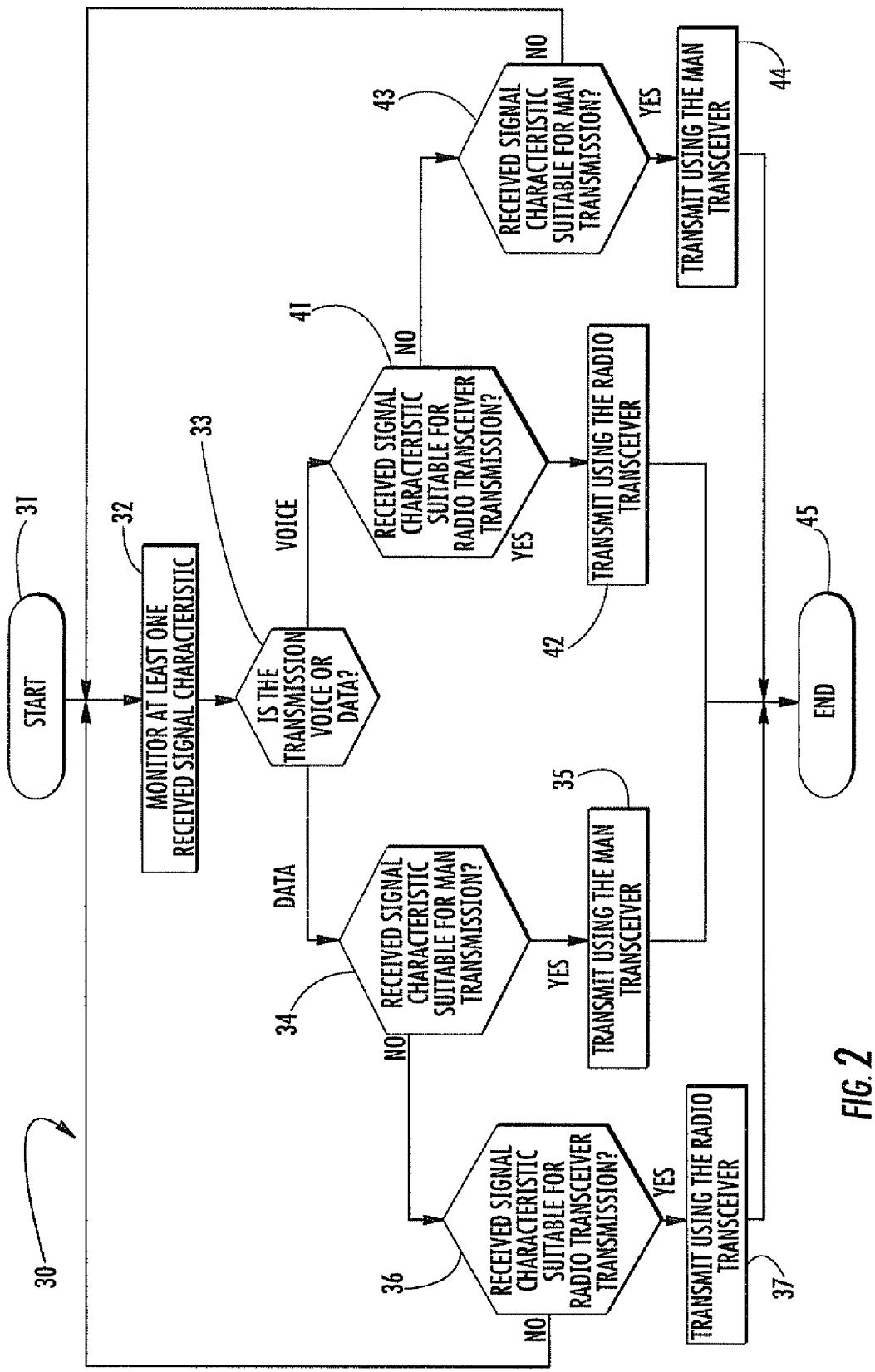
FIG. 2 is flowchart illustrating a method of operating the portable radio communications device, according to the present invention.

Referring now additionally to FIG. 2, a flowchart 30 illustrates a method of operating a portable radio communications device 12a-12n. The method begins at Block 31. The method includes monitoring at least one received signal characteristic at Block 32. At Block 33, the controller 16a-16n preferentially allocates the voice communications to the radio transceiver 17a-17n, and the data communications to the MAN transceiver 21a-21n.

At Block 34, if the received signal characteristic of the MAN transceiver 21a-21n is suitable for transmission, the data communications is transmitted via the MAN transceiver at Block 35. Otherwise, the controller 16a-16n checks the received signal characteristic for the radio transceiver 17a-17n at Block 36. If the received signal characteristic for the radio transceiver 17a-17n permits transmission, the data communications is transmitted via the radio transceiver at Block 37. Once the data communications is transmitted, the method ends at Block 45. If neither the MAN transceiver 21a-21n nor the radio transceiver 17a-17n can transmit the data communications, the method returns to Block 32.

At decision Block 41, if the received signal characteristic of the radio transceiver 17a-17n is suitable for transmission, the voice communications is transmitted via the radio transceiver at Block 42. Otherwise, the controller 16a-16n checks the received signal characteristic for the MAN transceiver 21a-21n at Block 43. If the received signal characteristic for the MAN transceiver 21a-21n permits transmission, the voice communications is transmitted via the MAN transceiver at Block 44. Once the voice communications is transmitted, the method ends at Block 45. If neither the MAN transceiver 21a-21n nor the radio transceiver 17a-17n can transmit the voice communications, the method returns to Block 32.

Figure 3:
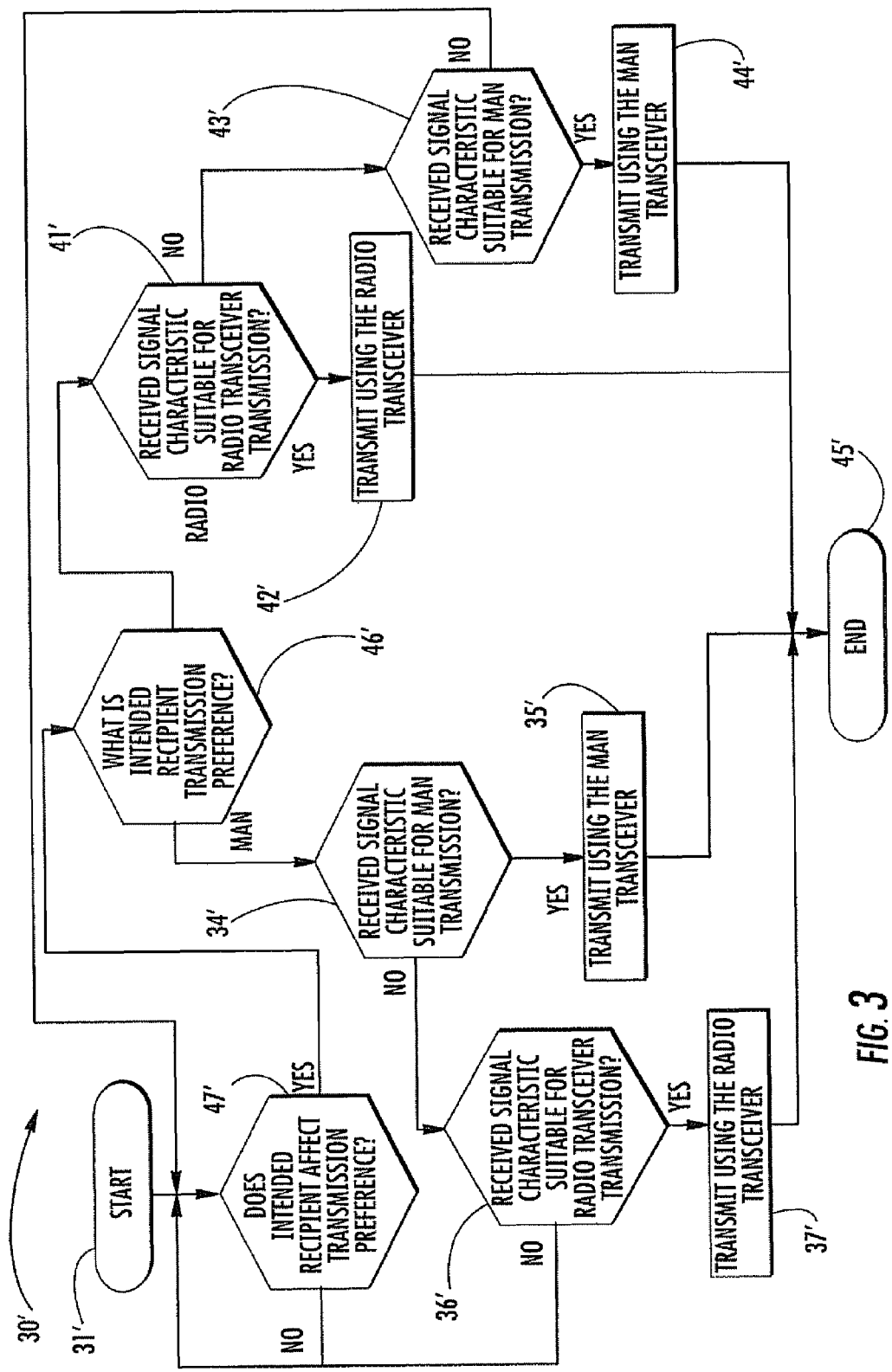
FIG. 3 is flowchart illustrating a second embodiment of the method of operating the portable radio communications device, according to the present invention.

Referring now additionally to FIG. 3, another embodiment of the method is now described. In this embodiment of the method, those elements already discussed above with respect to FIG. 2 are given prime notation and most require no further discussion herein. This embodiment differs from the previous embodiment in that the method further comprises determining whether the intended recipient affects transmission preference at Block 47'. If the desired recipient does not affect transmission preference, the method returns back to Block 47'. Alternatively, the method may proceed as outlined in the embodiment shown in FIG. 2. Otherwise, the method moves to Block 46' and determines which transceiver is preferred, moving to Block 34' if the MAN transceiver 21a-21n is preferred or to Block 41' if the radio transceiver 17a-17n is preferred.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
a plurality of portable radio communications devices; and
at least one metropolitan area network (MAN) base station;
each portable radio communications device comprising
a portable housing,
a radio transceiver operating at a frequency in a range of 30 MHz-3000 MHz and being carried by said portable housing for direct communication with a corresponding radio transceiver,
a MAN transceiver carried by said portable housing for indirect communication with a corresponding MAN transceiver via said at least one MAN base station, and
a controller carried by said portable housing for selectively allocating transmission of data and voice communications between said radio transceiver and said MAN transceiver based upon at least one received signal characteristic,
said controller having a desired allocation of the voice communications to said radio transceiver and a desired allocation of the data communications to said MAN transceiver.

2. The communications system according to claim 1 wherein each controller is also configured to allocate transmission of the data and voice communications based upon an intended recipient of the transmitted data and voice communications.

3. The communications system according to claim 1 wherein each MAN transceiver transmits the voice communications based upon voice over Internet Protocol (VOIP).

4. The communications system according to claim 1 wherein each MAN transceiver comprises an IEEE 802.16 WiMAX transceiver.

5. The communications system according to claim 1 wherein each radio transceiver comprises a half-duplex, VHF analog transceiver.

6. The communications system according to claim 1 wherein each MAN transceiver comprises an orthogonal frequency-division multiple access (OFDMA) transceiver.

7. A portable radio communications device for transmitting data and voice communications comprising:
   a portable housing;
   a radio transceiver operating at a frequency in a range of 30 MHz-3000 MHz and being carried by said portable housing for direct communication with a corresponding radio transceiver;
   a metropolitan area network (MAN) transceiver carried by said portable housing for indirect communication with a corresponding MAN transceiver via at least one MAN base station; and
   a controller carried by said portable housing for selectively allocating transmission of the data and voice communications between said radio transceiver and said MAN transceiver based upon at least one received signal characteristic;
   said controller having a desired allocation of the voice communications to said radio transceiver and a desired allocation of the data communications to said MAN transceiver.

8. The portable radio communications device according to claim 7 wherein said controller is also configured to allocate transmission of the data and voice communications based upon an intended recipient of the transmitted data and voice communications.

9. The portable radio communications device according to claim 7 wherein said MAN transceiver transmits the voice communications based upon voice over Internet Protocol (VOIP).

10. The portable radio communications device according to claim 7 wherein said MAN transceiver comprises an IEEE 802.16 WiMAX transceiver.

11. The portable radio communications device according to claim 7 wherein said radio transceiver comprises a half-duplex, VHF analog transceiver.

12. The portable radio communications device according to claim 7 wherein said MAN transceiver comprises an orthogonal frequency-division multiple access (OFDMA) transceiver.

13. A method of operating a portable radio communications device comprising a portable housing, a radio transceiver operating at a frequency in a range of 30 MHz-3000 MHz and being carried by the portable housing, and an metropolitan area network (MAN) transceiver carried by the portable housing, the method comprising:
   monitoring at least one received signal characteristic using a controller carried by the portable housing;
   selectively allocating transmission of data and voice communications between the radio transceiver and the MAN transceiver based upon the at least one received signal characteristic using the controller; and
   using the controller to provide a desired allocation of the voice communications to the radio transceiver and a desired allocation of the data communications to the MAN transceiver.

14. The method according to claim 13 further comprising using the radio transceiver carried by the portable housing for direct communication with a corresponding radio transceiver.

15. The method according to claim 13 further comprising using the MAN transceiver carried by the portable housing for indirect communication with a corresponding MAN transceiver via at least one MAN base station.

16. The method according to claim 13 further comprising allocating transmission of the data and voice communications based upon an intended recipient of the transmitted data and voice communications.

17. The method according to claim 13 further comprising transmitting the voice communications with the MAN transceiver based upon voice over Internet Protocol (VOIP).

18. The method according to claim 13 wherein the MAN transceiver comprises an IEEE 802.16 WiMAX transceiver.

19. The method according to claim 13 wherein the radio transceiver comprises a half-duplex, VHF analog transceiver.

20. The method according to claim 13 wherein the MAN transceiver comprises an orthogonal frequency-division multiple access (OFDMA) transceiver.

* * * * *